United States Patent
Aguera-Arcas

(10) Patent No.: US 9,786,075 B2
(45) Date of Patent: Oct. 10, 2017

(54) IMAGE EXTRACTION AND IMAGE-BASED RENDERING FOR MANIFOLDS OF TERRESTRIAL AND AERIAL VISUALIZATIONS

(71) Applicant: MICROSOFT TECHNOLOGY LICENSING, LLC, Redmond, WA (US)

(72) Inventor: Blaise Hilary Aguera-Arcas, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 337 days.

(21) Appl. No.: 14/214,343

(22) Filed: Mar. 14, 2014

(65) Prior Publication Data

US 2014/0362108 A1    Dec. 11, 2014

Related U.S. Application Data

(60) Provisional application No. 61/832,769, filed on Jun. 7, 2013.

(51) Int. Cl.
| | |
|---|---|
| G09G 5/00 | (2006.01) |
| G06T 11/60 | (2006.01) |
| G06T 13/80 | (2011.01) |
| G06T 15/20 | (2011.01) |
| G06T 17/00 | (2006.01) |

(52) U.S. Cl.
CPC ............ *G06T 11/60* (2013.01); *G06T 13/80* (2013.01); *G06T 15/205* (2013.01); *G06T 17/005* (2013.01); *G06T 2200/08* (2013.01)

(58) Field of Classification Search
None
See application file for complete search history.

(56) References Cited

U.S. PATENT DOCUMENTS 6,785,667 B2 *  8/2004  Orbanes ............... G06F 3/0346
7,840,032 B2    11/2010 Ofek
8,319,772 B2    11/2012 Fong et al.
(Continued)

FOREIGN PATENT DOCUMENTS

CN    102359791 A    2/2012
WO    2012040134 A2   3/2012

OTHER PUBLICATIONS

"International Search Report & Written Opinion for PCT Patent Application No. PCT/US2014/040781", Mailed Date: Aug. 7, 2014, Filed Date: Jun. 4, 2014, 16 Pages.

(Continued)

*Primary Examiner* — M Good Johnson
(74) *Attorney, Agent, or Firm* — Shook, Hardy & Bacon L.L.P.

(57) ABSTRACT

Architecture that extracts (analyzes and selects) a set of images from repositories or sources imagery to create one-dimensional (1D) and two-dimensional (2D) image manifolds (or image packets—also referred to as "synth" packets). The repositories of map imagery can include aerial views and terrestrial views (from points on the earth surface). The manifolds facilitate fluid translation between manifold images thereby providing a fluid user interactive navigation experience for viewing the location.

18 Claims, 7 Drawing Sheets

(56) References Cited

U.S. PATENT DOCUMENTS

| | | | | |
|---|---|---|---|---|
| 8,880,336 | B2* | 11/2014 | van Os | G01C 21/3635 345/173 |
| 9,310,992 | B2* | 4/2016 | Kornmann | G06F 1/1626 |
| 2007/0070069 | A1 | 3/2007 | Samarasekera et al. | |
| 2009/0303204 | A1* | 12/2009 | Nasiri | A63F 13/06 345/184 |
| 2010/0225644 | A1* | 9/2010 | Swope, III | G06T 13/00 345/419 |
| 2012/0019513 | A1* | 1/2012 | Fong | G01C 21/3673 345/419 |
| 2013/0170752 | A1* | 7/2013 | Ramnath Krishnan | G06F 17/30026 382/182 |
| 2013/0321400 | A1* | 12/2013 | van Os | G06T 15/005 345/419 |
| 2014/0365126 | A1* | 12/2014 | Vulcano | G01C 21/36 701/533 |
| 2015/0262391 | A1* | 9/2015 | Chau | G06K 9/00476 345/440 |

OTHER PUBLICATIONS

Snavely, et al., "Finding Paths Through the World's Photos", In ACM Transactions on Graphics, Article 15, vol. 27, Issue 3, Aug. 1, 2008, pp. 1-11.

Lupton, Benjamin, "Photosynth Meets Festivals", In Blog—balupton.com, Published on: Feb. 19, 2011. Available at: http://balupton.com/blog/2011-02-19-photosynth-meets-festivals.

"The Photosynth Photography Guide", A Microsoft Publication, Published on: Jan. 15, 2013, 10 Pages Available at: https://web.archive.org/web/20130115200347/http://cdn1.ps1.photosynth.net/docs/Photosynth%20Guide%20v8.pdf.

"Photosynth", In Wikipedia, The Free Encyclopedia, Published on: Feb. 26, 2013. Available at: http://en.wikipedia.org/w/index.php?title=Photosynth&oldid=540666238.

"Deep Zoom File Format Overview", Published on: Aug. 16, 2010. Available at: http://msdn.microsoft.com/en-us/library/cc645077(v=vs.95).aspx.

Raguram, et al., "Modeling and Recognition of Landmark Image Collections Using Iconic Scene Graphs", In International Journal of Computer Vision, vol. 95, Issue 3, Apr. 16, 2011, pp. 213-239.

"International Preliminary Report on Patentability Issued in PCT Application No. PCT/US2014/040781", Mailed Date: Sep. 17, 2015, 8 Pages.

"Google Maps Street View", Published on: Mar. 24, 2012, Available at: http://maps.google.com/help/maps/streetview/learn/turning-photos-into-street-view.html.

Leberl, et al., "Automated Photogrammetry for Three-Dimensional Models of Urban Spaces", In SPIE Proceedings, Optical Engineering, vol. 51, Issue 2, Feb. 1, 2012, 12 pages.

Kopf, et al., "Street Slide: Browsing Street Level Imagery", In Proceedings of ACM Siggraph, Jul. 2010, 8 pages.

Chye, Jennifer, "Getting a Better View with the Maps API v2: Aerial Imagery", Published on: Dec. 8, 2009, Available at: http://googlegeodevelopers.blogspot.in/2009/12/getting-better-view-with-maps-api-v2.html.

Honan, Mat, "New Google Maps: Offline Mobile Access, Improved 3D and More", Published on: Jun. 6, 2012, Available at: http://gizmodo.com/5916207/new-google-maps-offline-mobile-access-and-more-updating-live.

Xiao, et al., "Image-based Street-side City Modeling", In Proceedings of ACM Siggraph, vol. 28, Issue 5, Dec. 2009, 12 pages.

Xiao, et al., "Image-based Facade Modeling", In ACM Transactions on Graphics, vol. 27, Issue 5, Dec. 2008, 10 pages.

"First Office Action and Search Report Issued in Chinese Patent Application No. 201480032522.8", dated Mar. 20, 2017, 14 Pages.

* cited by examiner

IMAGE EXTRACTION AND IMAGE-BASED RENDERING FOR MANIFOLDS OF TERRESTRIAL AND AERIAL VISUALIZATIONS

CROSS-REFERENCE TO RELATED APPLICATIONS

This application claims the benefit of Provisional Patent Application Ser. No. 61/832,769, entitled "IMAGE EXTRACTION AND IMAGE-BASED RENDERING FOR MANIFOLDS OF TERRESTRIAL AND AERIAL VISUALIZATIONS" and filed Jun. 7, 2013, the entirety of which is hereby incorporated by reference herein.

BACKGROUND

Users are now afforded the capability to create image data using myriad devices, such as digital cameras, tablets, mobile devices, and smart phones, to name a few. In one example, a user can capture a set of images depicting a beach using a mobile phone. Subsequently, the user may organize the set of images as an album, a cloud-based photo sharing stream, a visualization, etc. In an example of a visualization, the set of images may be stitched together to create a panorama of a scene depicted by the set of images. Another example of visualization may be to create different visual moves or enhancement using the images. Unfortunately, navigating the visualization may be non-intuitive and/or overly complex due to the set of images depicting the scene from various viewpoints.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture extracts (analyzes and selects) a set of images from repositories or sources of map imagery (e.g., three-dimensional (3D)) to create one-dimensional (1D) and two-dimensional (2D) image manifolds (or image packets—also referred to as templates and "synth" packets). The repositories of map imagery can include aerial views and terrestrial (also referred to as ground-based) views (from points on or proximate the earth surface).

The architecture can comprise an extraction component that extracts images related to a location from image sources. The images are for use with a one-dimensional (1D) and/or a two-dimensional (2D) visualization template (also referred to as a manifold or synth packet). There are multiple different types of templates. The images are arranged and prepared according to the template (or manifold) to enable fluid translation (smooth and unconstrained in movement) between the images.

Fluid translation can be visually presented as a fading-out effect (or increasing a transparency setting) of a first image and a fading-in effect (or decreasing a transparency setting) of a next image when navigating "forward" or "backward" in the walk manifold image stack, and when navigating "left" or "right" in the wall manifold image stack. Fluid translation for panorama and spin manifold image packets can be the fused image presentation where the packet images for each are perceived as one overall (and continuous) image. A viewer component plays the selected visualization template in response to user interactive navigation of the images of the manifold. The user interaction by drags, swipes or any other interaction is presented as the smooth and unconstrained movement through the template images.

In accordance with a disclosed method, a location is identified for visualization. The synth packet can be created for a street-level view of a building or a street, for example. A visualization template is selected by which to render the location for interactive navigation. The template can be a one-dimensional visualization template (e.g., a walk) or a two-dimensional visualization template (e.g., a wall).

Images related to the location are extracted from image sources or repositories (e.g., 3D maps) for use with the selected template. The selected template arranges and prepares the images for the location to enable fluid translation between the images as the user interactively navigates the location via the images. The location is rendered according to the visualization template. That is, if the template is a wall template, images are selected as relate to the location, and oriented in a 2D arrangement for fluid navigation in two directions (e.g., horizontally and vertically).

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
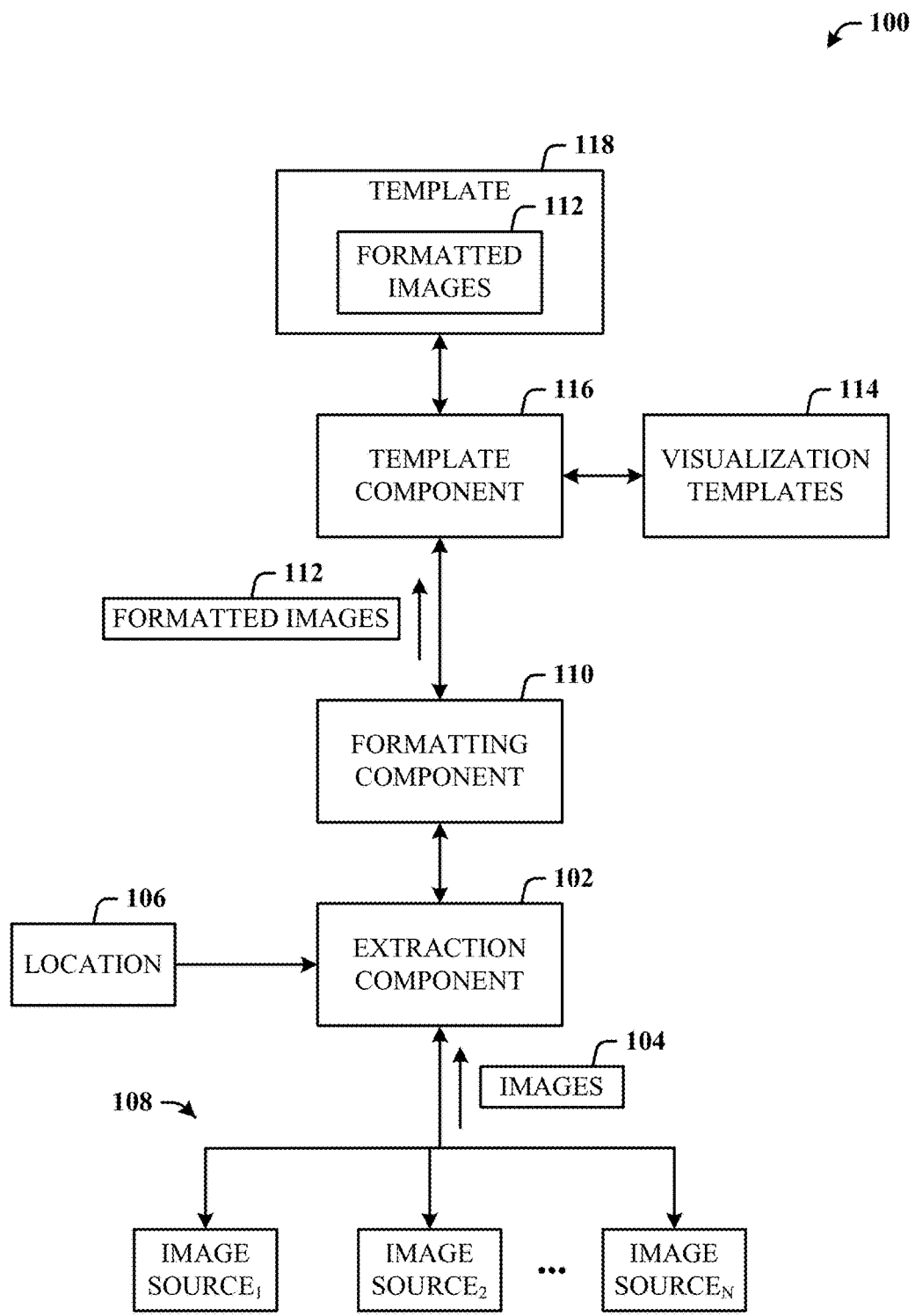
FIG. 1 illustrates a system in accordance with the disclosed architecture.

The disclosed architecture extracts (analyzes, selects, and/or reformats) a set of images from repositories or sources of images to create one-dimensional (1D) and two-dimensional (2D) image manifolds (or image packets—also referred to as "synth" packets). Each manifold is a "visualization template" for arranging and preparing the images for a given visualization experience. The repositories of imagery include aerial views and terrestrial views (from points on or proximate the earth surface) of locations, scenes and objects in the scenes, for example. The resulting synth packet provides an interactive view navigation experience of the location or scene via the images of the packet. The world comprises multi-dimensional manifolds, each locally connected in 1D or 2D, and which the 1D or 2D can be plugged together to cover the real 7D world in the space of 3D views of a location.

Following is a general description of synth packets. A synth packet is a unit of capture (set of images), such as a panorama, a wall, a walk, or a spin. The packet is captured at one time (a single session of multiple image captures of a location, scene, or object) and represented as a single file. With respect to the user experience, the packet is continuously and intuitively navigable as a single unit. "Continuously" navigable is intended to mean that "swiping" (a touch gesture or interaction) on the device display results in moving smoothly through the captured space. "Intuitively" navigable is intended to mean that the local movement under a finger (or a mouse pointer) during a swipe action is perceived by the user as direct manipulation (or follows an equally obvious interaction principle). "As a single unit" is intended to mean that the user perceives the navigation as associated with "one thing" (a single location, scene or object), and not exploring a complex extended environment.

For example, "spinning" around an object, looking at a panorama, or moving down a corridor are each perceived as a single experience with "one thing", whereas a branching maze involves decision trees and can be perceived by the user as not "one thing", but a complex environment. Accordingly, from a user's perspective, the idea of storing "one thing" in one file is also intuitive.

For an interactive view navigation experience, the synth packet can comprise the set of input images, a camera pose manifold, a coarse geometry, and a local graph. The interactive view navigation experience may display one or more current views of the location depicted by the set of input images (e.g., a facial view of the statue). The camera pose manifold provides view perspectives from which the location can be viewed, and coarse geometry is a multi-dimensional representation of a surface of the location upon which one or more input images can be projected.

The interactive view navigation experience enables a user to continuously and/or seamlessly navigate the location images in multidimensional space based upon interactive view navigation input. For example, the user may visually "walk around" the statue as though the scene of the statue was a single multi-dimensional visualization, as opposed to visually transitioning between individual input images.

The local graph (in contrast to the global graph for synth packets) specifies relationship information between respective input images within the synth packet (set of images), and thus facilitates interactive view navigation of the location or scene. For example, the local graph may comprise a first node representing a first input image and a second node representing a second input image. A first edge may be created between the first node and the second node based upon a navigation model indicating that the second image has a relationship with the first image (e.g., the user may have taken the first image of the statue, walked a few feet, and then taken the second image of the statue, such that a current view of the scene may be visually navigated from the first image to the second image). The first edge may represent translational view information between the first input image and the second input image, which may be used to generate a translated view of the scene based upon image data contributed from the first image and the second image.

The interactive view navigation experience may be provided based upon navigating the local graph within the synth packet. For example, the local graph may be navigated (e.g., traversed) from a first portion (e.g., a first node or a first edge) to a second portion (e.g., a second node or a second edge) based upon the interactive view navigation input (e.g., navigation from a first node, representing a first image depicting the face of the statue, to a second node representing a second image depicting a left side of the statue). The current view of the location or scene (e.g., the facial view of the statue) may be transitioned to a new current view of the location or scene corresponding to the second portion of the local graph (e.g., a view of the left side of the statue). Transitioning between nodes and/or edges may be translated into seamless 3D navigation of the location or scene.

The navigation model associated with a set of input images depicting a location or scene can be defined as part of the generation of a synth packet. The navigation model corresponds to a capture pattern associated with positional information and/or rotational information of a camera used to capture the set of input images. For example, the capture pattern may correspond to one or more viewpoints from which the input images were captured. In an example, a user may walk down a street while taking pictures of building facades every few feet, which may correspond to a strafe (or wall) capture pattern. In another example, a user may walk around a statue in a circular motion while taking pictures of the statue, which may correspond to a spin capture pattern.

Synth packets are a general, yet constrained, mechanism for capturing, representing, and navigating continuously through "packets" (connected sets) of imagery. Synth packets are part of a hierarchy defined between individual images and a global graph—the global graph is comprised of packets and the packets are comprised of images. Global graph connectivity enables linking and navigation between the graph packets, and as previously described, a local graph enables connectivity between overlapping images of the synth packet. Each image in the packet represents a single "resting point" for a view of a location or scene. Images are singular, and packets can include a limited number of images (e.g., one hundred) and are generally captured by a user in one session. The global graph is unlimited, dynamic, and evolves over time.

The disclosed architecture constructs a dimensional (e.g., 1D, 2D) terrestrial experience that is both photorealistic and designed to enable fluid translation across images (and not just rotation as associated within an individual panorama). At least two translation modes are provided: a forward-facing mode (e.g., walking down a street facing forward), and a strafing (or wall) mode (viewing laterally while facing a façade).

Additionally, content of one visualization tool can be converted (formatted) for use in a graph-based image manifold viewing experience; photographic content from a non-graph-based program can be reformatted for utilization in the image manifold viewing experience graph.

When building online maps, large volumes of nadir and oblique aerial imagery is captured. An existing approach to view this imagery is via a conventional 2D+zoom experience or via a Flight Simulator™-like 3D experience. The disclosed architecture enables a mode of experience for aerial content: interlinked subject-dependent manifolds, such as "spins" of downtowns, major landmarks, and buildings, for example, and other points or objects of interest. This aerial interaction is more semantic, more touch-friendly, and more photorealistic for viewing on tablets and similar devices. Moreover, aerial content of this kind can be received into the architecture for further visualization processing.

Content (e.g., image) is generated that can be navigated and experienced the same way as terrestrial and aerial manifolds. Photorealistic transitions among all of these content types are enabled in the context of the map, thereby unifying visual content among all sources, such as structured aerial capture, structured ground-based (terrestrial) capture, and crowd-sourced capture.

Synth packets can be 1D types: panorama (also "pano"; the camera pivots on axis and is outward pointing to capture images of the surrounding environment), spin (the camera is inward-pointing to capture images of the scene or object while rotating about an axis of the object or scene), walk (capturing images as the camera moves in a single forward-looking direction), and wall (while a camera is aiming at the scene or location and capturing images, the camera is also moved sideways in parallel with the scene or location, e.g., in front of a wall or façade).

In addition to the 1D manifolds, there can also be 2D manifolds, such as spherical panos and objects, large walls captured with multiple images arranged in a grid pattern, and cross products of these 1D and 2D manifolds (e.g., a torus of inward-facing poses, but with a vertical panorama at each point).

Following is a description of some specific types of synth packets that can be created by the extraction of suitable images from image repositories; however, this is not to be considered an exhaustive list of synth packet types.

Walls for the facades of street-level blocks can be created that result in a beautiful experience and a faithful rendition of the original imagery and geometry (computing is performant due to the packet representation optimizations); forward-facing walks along each street, in both directions; spins of roundabouts (at street intersections), fountains, and other points of interest that are partially or fully circled with capture events; unfused outward panoramas formed from multiple capture events at intersections; and, unfused inward panoramas (empty spins) formed from multiple capture events at intersections and shot (the camera is pointed) across the intersection. In a "fused" panorama, individual images are stitched into a single bigger (overall) image, wherein the single image individuality is lost. An "unfused" panorama can be experienced using the same gestures and interactions as a fused panorama, but it looks very different—the user is always either on an original photo or transitioning between original photos; parallax can be preserved, giving the panorama a three-dimensional feel rather than feeling like a flat image.

Individual capture events can be treated as panoramas. When the individual event images are captured at precisely (approximately) the same time and with a common focal point, there are few benefits to leaving such a panorama unfused. (Note that a fused panorama is considered to be a degenerate case of a synth packet.)

With respect to aerial perspectives, spins of downtowns and other high-rise areas (or other types of elevated points of interest) can be created. Note that these spins can be formed from a smaller number of images than normal spins (e.g., as few as four images for a complete circle). These spins can also be two-dimensional that cross the ring (formed by the spin trajectory at a specific altitude) with two or more off-nadir angles (e.g., a pure nadir, or nadirs at thirty and sixty degrees). Additionally, multiple concentric shells can be considered (e.g., a high-level dome over a city as well as inner domes around different parts of downtown).

With respect to spins of individual buildings, if only four views are supplied, buildings may be best viewed obliquely from forty-five degree angles, and not directly facing the facade. For downtown city views the same principle can be applied, but relative to the overall city orientation. Synth packets can also be derived for walls of mountain ranges, canyons and other major features, captured at content-specific oblique angles. Similarly, synth packets can be created for walks along mountain ranges, within canyons, and down rivers, as well as spins around scientifically important geological structures such as mountains, rivers, or other natural structures.

Synth packets can also be created as obtained from maps as captured using UC-G (Ultracam G) (an aerial sensor used for wide area and continental mapping) flight lines. The very high productivity of the UC-G camera comes from a combination of high altitude and wide field of view. This provides a considerable amount of oblique/3D coverage in addition to the stitched nadir view. The original UC-G flight lines can be turned into walls, thus providing the oblique looks where desired and in the right orientations.

With respect to additional forward-looking examples, satellite imagery of moving storm systems can be transformed into walls. Movement in space and time can be coupled in this case. A 2D spin can be created for the entire Earth (given that it is nearly a perfect sphere). Image manifolds can be created for other celestial bodies (e.g., of the solar system) such as the moon, Mars, and other planets. These manifolds include Rover walks, panoramas, and walls taken from space.

With respect to the night sky, there are numerous sky surveys with many frequency bands and distinct visualizations. At the highest resolutions, coverage is excessively non-uniform that the night sky is better visualized using synth packets than using a uniform "deep zoom" type technology.

The process of mining the map imagery yields many valuable outcomes in terms of user experience, development speed and efficiency, leveraging assets, and providing an instant crowdsourcing platform. Because the image content is segmented into synth packets of a finite size, and the viewer for these packets is reasonably simple, it works as an inline WebGL (web graphics library—a JavaScript™ API for rendering interactive 2D or 3D graphics in a web browser) or native control, which can be used in applications and on webpages. The control enables embedded viewing of objects, large surfaces, and crowd-sourced content, and additionally, the control allows spinnable (use the spin manifold) landmarks, pannable (using the panorama manifold) shop facades, etc. For example, 3D Instant Answer can be enabled on a search engine (e.g., Bing™) for every landmark that has been aerially imaged. Second or third party tablet applications showcasing places or events can embed 3D views of the landmarks.

Synth packets can be linked together into a global graph. The edges between synth packets derived from map imagery are defined, enabling enriched exploration and the linking of synths captured in places that have already been imaged, thereby reducing or eliminating the linking or matching engineering work that otherwise would be required multiple times—simply linking synth packets is sufficient. In support thereof, feature points can be stored in synth packets.

Synth packets enable a visually optimized, simplified, intuitive, and touch-friendly navigational model. Each packet is 1D or 2D, maps directly to one or both axes of the device display and provides an experience close to direct manipulation. Moreover, the navigational manifolds stay close to points of view actually captured, making the visual experience as perfectly representational as possible.

Moving between synth packets can be accomplished by tapping, moving beyond a manifold edge, or—in certain cases and for 1D manifolds—by moving orthogonal to the manifold. For example, an up/down motion in a walk along a street moves forward and backward on the street, while a side-to-side motion can transition to a façade. Applying this visual optimization and uniform navigational gesture language to aerial and street-level content makes the user experience both visually beautiful and experientially consistent/intuitive. It also consumes less space on the server and requires less download activity and content.

Mapping makes use of the concept of tappable (touch-based user interaction) visual labels as navigational affordances. This is touch-friendly, avoids the continual use of two-finger zoom gestures (although this can still be utilized), and works semantically so that the view can be represented in a namespace (e.g., earth/usa/wa/seattle/downtown/pioneersquare). Linked visual manifolds can follow such a hierarchy perfectly; by adding the capability to spatially label neighboring synth packets in the viewer and use these labels for tappable transitions, a purely visual hierarchical map is realized, and elements in the hierarchy can now be of multiple distinct types.

Since the disclosed architecture can involve moving among synth packets extracted from a map—or in a synth packet precisely positioned in an exterior space relative to the map—the environment can be considered an Earth global coordinate frame. However, the graph can extend into interiors or other spaces that do not have precise geometric relationships to the map. This is natural and unproblematic (and powerful) when navigating the graph visually. Semantic tappable labels remain useful in these situations. When the synth viewer is incorporated as a renderer into the map application, the application can simply turn off most mapping affordances when "off the map" in this way, while keeping track of where the user has been allowing the user to return (either back one link at a time, or "back to outside", in one step).

Crowd-sourcing human-scale content using conventional techniques is very difficult, because taking a single panorama without a one-shot panoramic camera is time-consuming, requiring dozens of photographs taken under difficult conditions (e.g., keeping the focal point very still), and taking a panorama every few meters is prohibitive. However, experiencing street-level imagery primarily through manifolds, the user can capture equivalent manifolds directly with much less effort. An entire city block, for example, can be captured in a few minutes by traversing the street four times: once, strafing each façade (perhaps from the opposite side of the street to maximize field of view and allow for captures that are not too closely spaced), and once, for walking in each direction. This approach also works for interiors such as a hallway, for example.

The difficulty of engineering portable, low cost panoramic capture devices stems primarily from the technical requirement to trigger all cameras simultaneously and move the cameras sufficiently close together to (nearly) share a common focal point. With synth packet manifolds, however, these requirements are eliminated, allowing the camera system to become much simpler (e.g., a camera system can simply comprise of four cameras pointing forward, back, and to the sides, each shooting independently at intervals). Moreover, benefit is obtained from a known baseline between the cameras, as this provides stereo depth information per-capture with an absolute scale, and additionally (assuming the desire to create panorama manifolds per capture event) gives the visual experience a sense of dimension and parallax.

The manifold experience may be more compelling and higher-performance than a current fused panorama-based experience due to inadequacies for strafing or walking along the street (critical movements for human-scale exploration in a city). Both the walks and the strafes can be rendered with a wide field of view, making these manifolds work on giant immersive displays as well. A client renderer can bring in the existing complete fused panoramas when the viewer comes to a standstill, allowing for seamless complete rotation. Transitions between walks, strafes, and fused panoramas are seamless, since these are generated from the same imagery and geometry.

Crowd-sourced aerial and human-scale work the same way. Accordingly, crowd-sourced aerial imagery that consists purely of manifolds now becomes simple.

Since the manifold publishing can be immediate, curated content (sorted and selected relevant content) can be quickly published in response to a big event, natural disaster, or other news story. Aerial and ground-based imagery of a city after a big storm or bombing, or simply imagery of a parade can be added with existing tools or simple scripts, and becomes available immediately. Manifolds can be linked-to using a URL (uniform resource locator) or featured on a curated content page or application in or near realtime (processed in the timespan that the actual event is occurring). When content is posted, it becomes immediately visible to everyone. With a suitable social infrastructure, when added into a map, the map becomes a realtime social surface area.

Individual synth packets often have a time component, in that constituent images are shot in a temporal sequence (e.g., chronologically). This temporal dimension is implicit in the data even when the exploration experience is not optimized for movement in space/time, but rather for pure rotation (staying within a simultaneously captured bubble). The disclosed architecture includes the capability to process movement between manifolds along the time axis when the capture pattern is supported (the same spot has been captured, perhaps by different people, at different times). Use of this pattern means that repeated drives, flights, or crowd-sourced captures of the same spot result in the ability to "scrub" in time while remaining fixed in space.

With respect again to aerial manifolds, options are provided regarding how to generate spin movies and similar manifolds from aerial imagery (e.g., ranging from minimally to maximally processed). Using a building spin as an example, in a first approach, begin with an ensemble of raw images that can see a building and build the spin from these raw images (or a subset that provides suitable visibility). The first approach may suffer (unlike with handmade spins) due to the source image not being centered on the object desired, and results in a mismatched scale. In a second approach, this means it is likely that the relevant image region may be cropped, and then also have an odd non-centered projection. If the projection is fixed to make the cropped image region properly centered, re-rendering may need to occur onto the proxy geometry and disocclusion errors (an artifact exhibited due to the lack of samples for surfaces that are visible from a desired view, but not from the reference view, and can occur for small translations due to the cropping process) from neighboring images may need to be filled.

In a third approach, if a city is well imaged, for example, any given building can be re-rendered from an arbitrary (reasonable) point of view, using a combination of source images. (This can be achieved by focusing on rendering orthographic imagery in order to enable infinite panning and zooming—at the cost of needing to compute shadow maps and coverage functions dynamically on the client.) This third approach involves re-rendering perspective images from the desired viewpoints. These can be selected on a per-building basis with sensitivity for both the structure and the way the building is photographed. Multiple images will be graph-cut and blended together to generate these synthetic views, but in general, there may be some angular and temporal coherence among these views. In a fourth approach, the views can be rendered from a previously calculated full 3D model.

The second approach optimizes for faithfulness to the original imagery, while the third approach compromises between the imagery and the content.

With respect to very high resolution "deep zoom" type imagery (a nadir-view map is in effect a single giant very high resolution multi-scale tiled image) is not really an image, but a composite built from many sensors at many altitudes and times. Oblique images can be used to extend this technique to oblique views of the Earth as well by, as in the nadir case, adopting an orthographic projection. However, real images are not orthographic, but perspective, and cannot have an infinite number of pixels. Additionally, oblique images are shot from a particular point of view and at a particular time. The practical limit for single source images may be on the order of giga-pixels, and can be very time-consuming stitches of very large numbers of lower-resolution images. However, synth packets are superior both experientially and technically.

In the disclosed architecture, zooming is an image space operation, allowing the current image to be explored in original form. Moving along manifolds in 3D occurs when looking at whole images. This approach does not require strange interpolations between on-axis and off-axis camera models, or introduce artifacts during zoom by re-projecting the original image.

Accordingly, the optimum uses of fused imagery are to synthesize wider field of view imagery than a single sensor can capture (e.g., large areas of land from a very high altitude), and to synthesize single perspective views (as in the second and third approaches described above) when handling a large number of color-balanced sources and wanting very particular views.

As previously indicated existing imagery is mined from image collections (repositories, sources) such as 3D collections, to create single (1D) and multi-dimensional (2D, etc.) manifold image sets such as panos (panoramas), spins, walls, and walks, as well as for extracting manifolds from aerial and terrestrial imagery. In most cases (not involving simultaneous capture with a multi-camera system), the manifolds are also temporal. The disclosed architecture can use the manifolds to extend from local spatial exploration within a manifold to exploration between manifolds, and in time, as described herein.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 in accordance with the disclosed architecture. The system 100 can comprise an extraction component 102 configured to extract images 104 (e.g., maps) related to a location 106 (e.g. a building, intersection, façade, etc.). Each of the images 104 can be associated with metadata, for example, or other identifying data that identifies an image as being of or closely related to the location 106.

The images 104 can be extracted from any one or more of image sources 108, such as a first image source (Image Source$_1$—a structured aerial-based image source of structured aerial-based images), a second image source (Image Source$_2$—a structured ground-based image source of structured ground-based images), a third image source (Image Source$_3$—a crowd-sourced image source of crowd-sourced images), and/or other image sources (Image Source$_N$), based on the location 106. It is to be understood that the image sources 108 can include multiple instances of the same types of sources (e.g., as may be located differently by of aerial shots) as well as other different types of sources, such as street cameras, cloud-based repositories of personal images, street-level cameras, building cameras, and so on. A camera "shot" refers to the camera placement (e.g., aerial, low-angle, over-the-shoulder, reverse, etc.) and angle relative to the scene to be captured (imaged). A panoramic view is a combination of images with an elongated field of view (also called wide format photography).

The system 100 can further comprise a formatting component 110 that formats the extracted images 104 from one or more of the sources 108 into formatted images 112. The sources 108 can comprise structured aerial images, structured ground-based images, and crowd-sourced images, into a suitable format(s) for visualization templates 114. The formatting process can include structuring an image from a source to be compatible with a template, the template for implementation in a graph-oriented map. For example, 1D and 2D aerial images can be formatted into interlinked subject-dependent templates, such as "spins" of downtowns, major landmarks, buildings, etc. The templates 114 enable a new user experience that is more semantic-based and touch friendly for viewing on tablet computers and similar devices, and which are also more photorealistic than existing systems.

A template component 116 of the system 100 can be configured to arrange the extracted and formatted images 112 according to a visualization template 118 (of the templates 114); the visualization template 118 (and templates 114) enables translation between the formatted images 112 via a viewer (not shown). The templates 114 (also referred to as manifolds) are sets (or packets) of images arranged according to a specific visualization (e.g., a façade). For example, one template can be a series of images formatted to enable a user to interact and transition between the template images using the viewer.

The visualization template 118 can represent a street-level view of the location 106 based on street-level shots extracted from one or more of the structured ground-based image sources. The visualization template 118 can represent an aerial view of the location 106 based on aerial shots extracted from one or more of the structured aerial-based image sources. The extraction component 102 can be configured to extract perspective images of forward shots and side shots from a panorama image, for example, of the sources 108.

The visualization template 118 enables the perception of image changes in time and space via the viewer. The visualization template 118 is from a graph-based set of visualization templates. The visualization template 118 enables the play of time information (via the viewer) that corresponds to navigation through the images of the visualization template 118. The template component 116 creates a graph of spatially-related packets of templates obtained from a map and structured hierarchically for interactive transitions between the packets.

Figure 2:
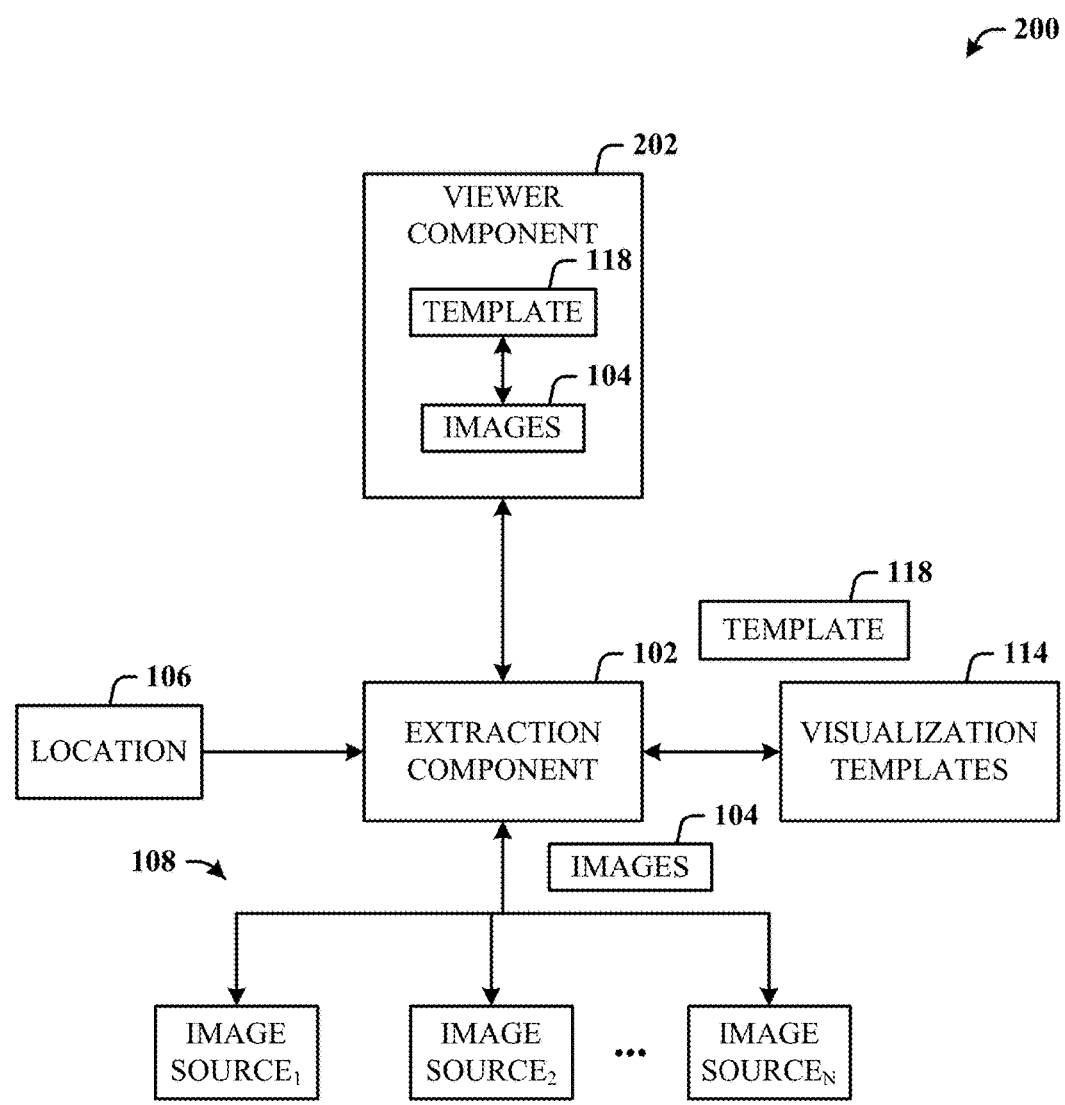
FIG. 2 illustrates an alternative embodiment of a system in accordance with the disclosed architecture.

FIG. 2 illustrates an alternative embodiment of a system 200 in accordance with the disclosed architecture. The system 200 can include the extraction component 102 configured to extract the images 104 related to the location 106 from one or more of the image sources 108 of multi-dimensional maps. When considering the creation of a single template, the images 104 are for use with a visualization template (e.g., one-dimensional, two-dimensional, three-dimensional, etc.) of multiple different types of the templates 114 created. The images 104 are arranged according to the selected visualization template 118 to enable translation between the images 104. The images are arranged according to the template 118, are also referred to as a manifold (and a synth packet). A viewer component 202 is provided and configured to play the selected visualization template 118 of the images 104 (or manifold) in response to user interactive navigation of the images 104 of the template 118.

In this embodiment, the formatting operation, if needed, can be performed in combination with extraction by the extraction component 102. Additionally, the extraction component 102 can be configured to directly access the visualization templates 114 for the desired template 118 into which the images 104 are processed for photorealistic transitioning in response to user interactive navigation.

Although not shown, to prevent privacy issues for individuals, privacy image processing software can be employed that automatically blurs faces, vehicle number plates, and other personally identifiable information that may be captured in the images. In addition, any image that is deemed to be inappropriate or sensitive can be flagged for review and possible removal.

It is to be understood that in the disclosed architecture, certain components may be rearranged, combined, omitted, and additional components may be included. Additionally, in some embodiments, all or some of the components are present on the client, while in other embodiments some components may reside on a server or are provided by a local or remove service.

Figure 3:
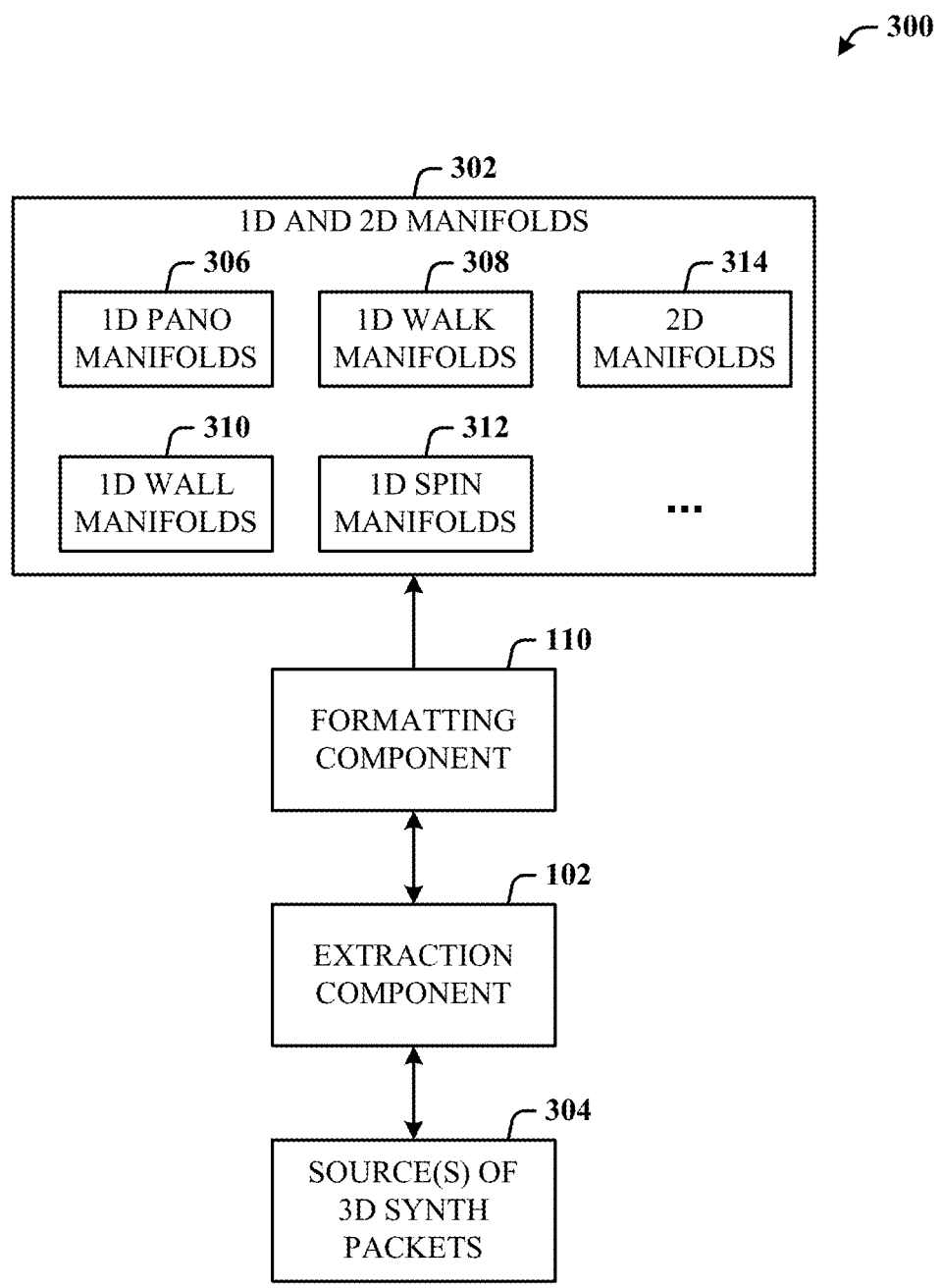
FIG. 3 illustrates a system that enables the extraction and format of images obtained from other types of 3D image sources for conversion into 1D and 2D manifolds.

FIG. 3 illustrates a system 300 that enables the extraction and format of images obtained from other types of 3D image sources for conversion into 1D and 2D manifolds 302. Accordingly, the extraction component 102 interfaces to one or more sources 304 of 3D synth packets. The extraction component 102 searches and extracts sets of connected images from 3D image sets; the extracted sets include panos (panoramas), spins, walls, and walks, etc., for the sets of 1D and 2D manifolds 302. Where needed, the extracted sets of connected images are formatted using the formatting component 110 such that the extracted sets can be used in the 1D and 2D manifolds 302. For example, the 1D and 2D manifolds include, but are not limited to, 1D pano manifolds 306, 1D walk manifolds 308, 1D wall manifolds 310, 1D spin manifolds 312, and 2D manifolds 314.

Figure 4:
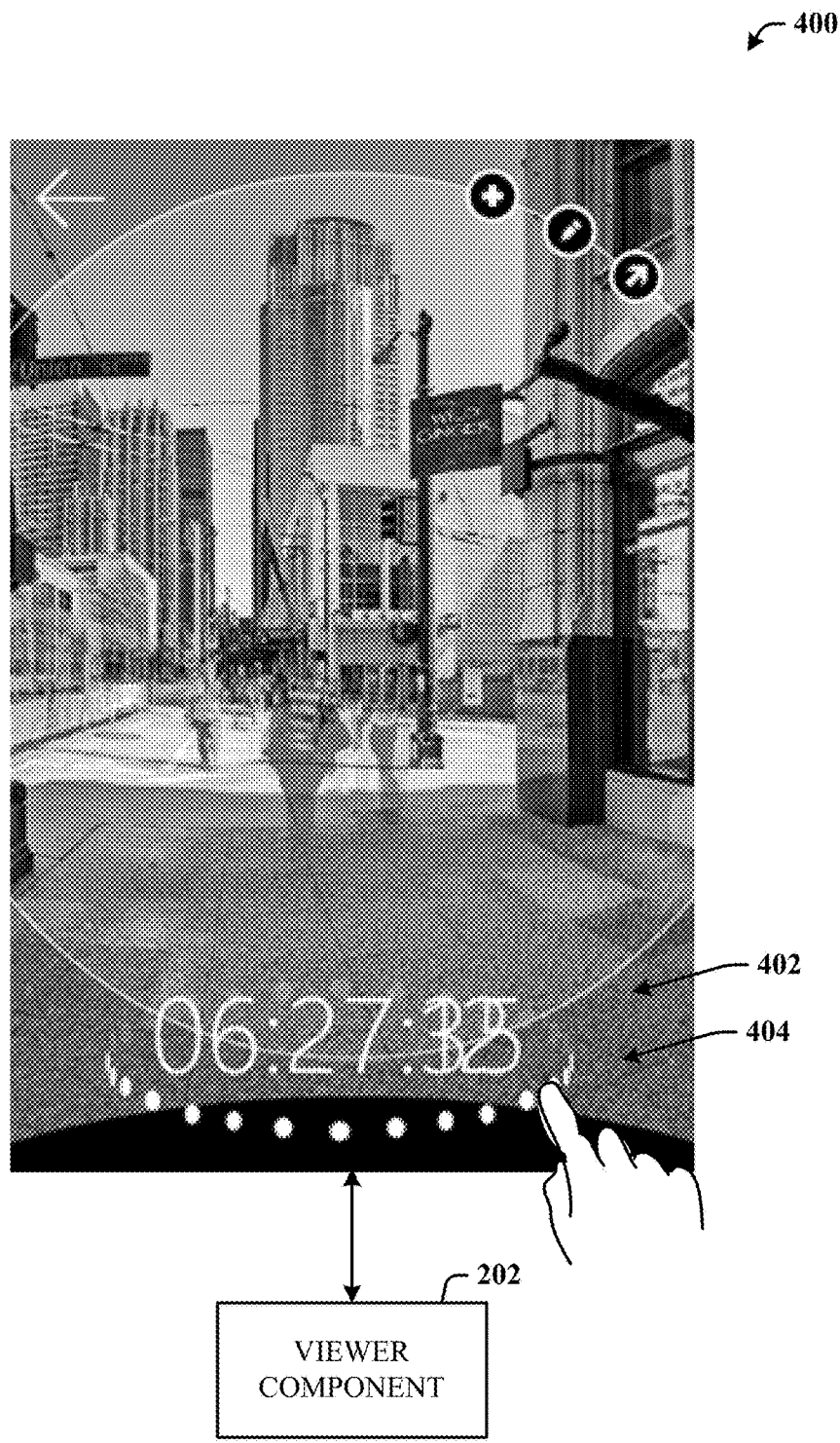
FIG. 4 illustrates an exemplary time-spin walk manifold in accordance with the disclosed architecture.

FIG. 4 illustrates an exemplary time-spin walk manifold 400 in accordance with the disclosed architecture. A time manifold is obtained by explicitly selecting a set of images of a location (e.g., the location 106) captured over a time interval, and then creating a 1D image manifold (also referred to as a template) over that set of images, ordered in time. Just as a walk manifold may wander, to some small extent, to the side as it advances, a time manifold may also have a spatial extent; for example, time-lapse camera movement over the course of a day, or even a season, which may look like a 1D spin around a tree in which at one end of the spin arc the time is January, and at the other end of the spin arc the time is August. There are densely photographed places in the world from which time-spins and/or time-walls (a 2D grid of parallel photos) of this kind can be obtained from existing imagery. A common case is a stationary, or approximately stationary, camera, and a purely temporal synth.

The time-spin walk manifold 400 (as rendered using the view component 202) is presented showing a clock 402 that presents the time related to the images of the image stack of the manifold (or template) 400. The user can interact with the manifold 400 by executing a gesture, such as a touch-type swipe motion on a spin object (or control) 404 that can be spun (rotated clockwise or counter-clockwise) to increment or decrement the time aspect of the manifold 400. In synchronism with the changing time of the spin action, the associated images are fluidly transitioned so the user sees a backward or forward movement in the walk manifold as presented by the corresponding images that fade in or out (transition) depending on the time and user navigation.

In a purely spatial view (no time aspect), not time affordance is presented, and the spin object 404 or some other suitable object may be automatically provided and utilized (redirected) to enable the user gesture to cause forward and backward movement and transitioning among the manifold images, as in this walk manifold example. Alternatively, as described herein, the forward/backward motion in the view can be implemented using an up/down gesture: an "up" gesture transitions the view forward through the manifold images, and a "down" gesture transitions the view backward through the manifold images.

For a stationary synth in pure time, the navigational interaction allows a swipe (e.g., horizontal) gesture to flip (incrementally navigate) through the manifold images. As with any synth described herein, on release or cessation of the gesture (of the swipe interaction), the view drifts to the nearest image in time.

As related to a 1D stabilized trajectory, the view can remain spatially fixed during a swipe, rendering all other images in the manifold from the perspective of the one from which the swipe began. This enables swiping to be used to best effect for direct visual comparison across time, while honoring the principle that on a release action, drifting to (slowing down to settle on) an original image, and thus avoiding leaving view extrapolation or blending artifacts on the screen.

Time can be displayed during the swipe (or other suitable user interaction); however, time can be configured to be displayed based on specific conditions. It can be the case that time and date are displayed during synth viewing, generally. Time can also be presented in different ways (e.g., not only absolute time, but time modulo a day—wrap all source imagery modulo time of day, and construct the manifold based on time of day instead of absolute time). Other moduli can also be considered (e.g., time of year).

The synth creation experience, in particular, can be made lightweight by multi-select from the camera roll. (Other parts of the application, aside from the viewer itself, can be performed using a mobile website, which can enable synth creation to be performed without an application at all, as is possible on a computer.)

Manual time manifold creation is also provided, and can be provided as follows. Given a starting image, time manifold mining (e.g., specifying a modulo, if desired) looks for nearby possibly matching images, identifies a good set, and makes a new time synth out of the set.

The notion of time manifolds and image manifolds infers that an image may be in more than one synth. Given an image, reverse lookup can be performed to search for the synth in which an image is used.

In one implementation of the viewer, if the current image or one of its neighbors is in a time synth, the clock affordance appears. Activating the clock affordance (the clock control 402) moves to the right (associated in time) image, and allows the user to spin in time, in effect seamlessly switching the synth being navigating on via the shared image. In both the viewer and on the server, the image is assigned a unique ID and the image is copied only by reference (and not duplicated). This technique can be employed for the reverse lookup of an image. However, thumbnail images can be duplicated for the multiple "contact sheets" uses to accelerate the loading of a synth.

This approach can be used to link manifolds. Image sharing can be employed to link manifolds, because all that is needed is the membership lookup from image to synths.

With respect to the navigation experience, the viewer enables the user to "switch tracks" so that gestures move along one manifold or another at junction points. For specific kinds of junction points it is possible to "slot fill" to provide navigational affordances for multiple (e.g., two, three, etc.) different manifold types at once. For example, dragging above the horizon line rotates in place (navigating the 2D manifold of rotations); dragging on the street while facing roughly forward moves along the 1D walk manifold; dragging on the street while facing sideways strafes; if the user is trying to drag beyond the terminus of a strafe, and there is a strafe sharing the terminal image and oriented similarly that would allow further movement, switch tracks to allow the gesture to continue. Walks can be extended in similar ways.

Note navigational affordances can applied to junctions between the manifold types as well. Another implementation employs a "circle language" for traversing from manifold to manifold.

To address limiting the degree of a graph so that from any given image there are a finite (small) number of options for motion, a mechanism for doing this a ranking function for ranking synths to which an image belongs. Then, on movement to a new image, get pointers to the top N. This ranking function may be personalized, as well, so that, for example, any synths a user created are ranked above the cutline (threshold for the ranked list), and synths of friend can be boosted as well.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
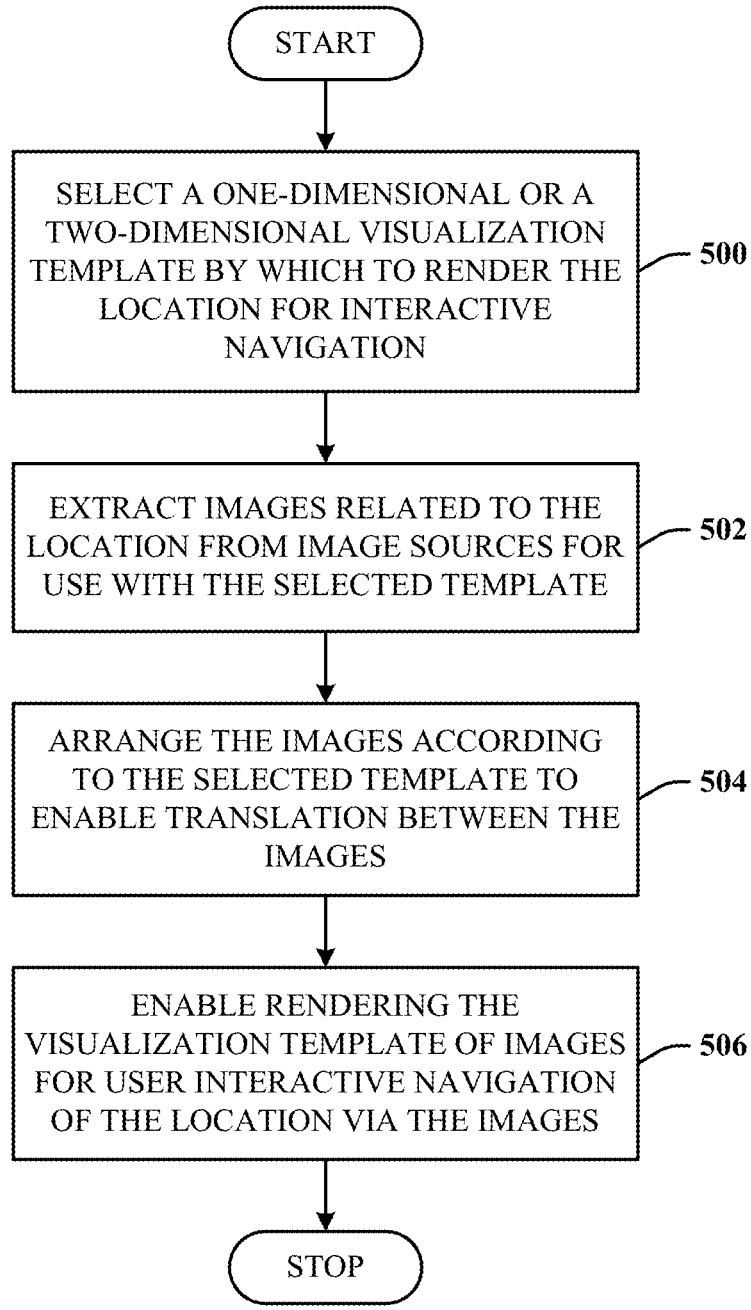
FIG. 5 illustrates a method in accordance with the disclosed architecture.

FIG. 5 illustrates a method in accordance with the disclosed architecture. At 500, a visualization template is selected by which to render a location (geographical) for interactive navigation. The template can be a one-dimensional visualization template (e.g., a walk) or a two-dimensional visualization template (e.g., a wall). The user can choose to create a synth packet (or template) for a street-level view of a building or a street, for example. At 502, images related to the location are extracted from image sources or repositories of images (3D) for use with the selected template. The images can be connected (e.g., captured sequentially and extracted as a sequential set), provided the images are suitable for 1D or 2D image transitions for the given template.

At 504, the images are arranged (e.g., ordered spatially, ordered temporally, etc.) according to the selected template to enable translation between the images. At 506, the visualization template of images is enabled for rendering for user interactive navigation of the location via the images. That is, if the template is for a wall, images are selected as relate to the location or scene, and oriented in a 2D arrangement for fluid navigation in two directions (e.g., horizontally and vertically) to fully experience the wall or façade.

The method can further comprise creating photorealistic transitions between multiple content types of the images according to the visualization template. This can be accomplished by using connected (or consecutive) photos or images obtained from 3D sources such as panorama shots. The method can further comprise formatting image content to be compatible with the template, which is a graph-based photograph template.

The method can further comprise formatting image content from sources that comprise structured aerial images, structured ground-based images, and crowd-sourced images. The formatting process may be optional since it is possible that the obtained images are of a suitable format for use in a template; however, it is more likely that formatting will be performed in most cases. The method can further comprise rendering the images of the visualization template in correspondence to time of day. When using a time manifold, as the user navigates the visualization via the viewer, using a time control, an image associated with a specific time is selected by the user is then rendered in combination with the time presented. The graph-based technology enables movement between manifolds (templates) along the time axis. Gestures can be interpreted to cause movement along one manifold or another manifold at graph junction points. Repeated drive captures (shots), flight captures, and/or crowd-sourced captures of the same spot (location) enable the capability to analyze and assemble images in time while remaining fixed in space.

The method can further comprise extracting the images from three-dimensional image collections. For example, nadir and oblique aerial imagery typically accompanies 2D plus zoom experiences and 3D experiences. Thus, using aerial imagery enables the utilization of interlinked subject-dependent manifolds, such as spins of downtowns, major landmarks, buildings, etc. Accordingly, the method can further comprise enabling rendering of the visualization template as one of a panorama, wall, walk, and a spin.

Figure 6:
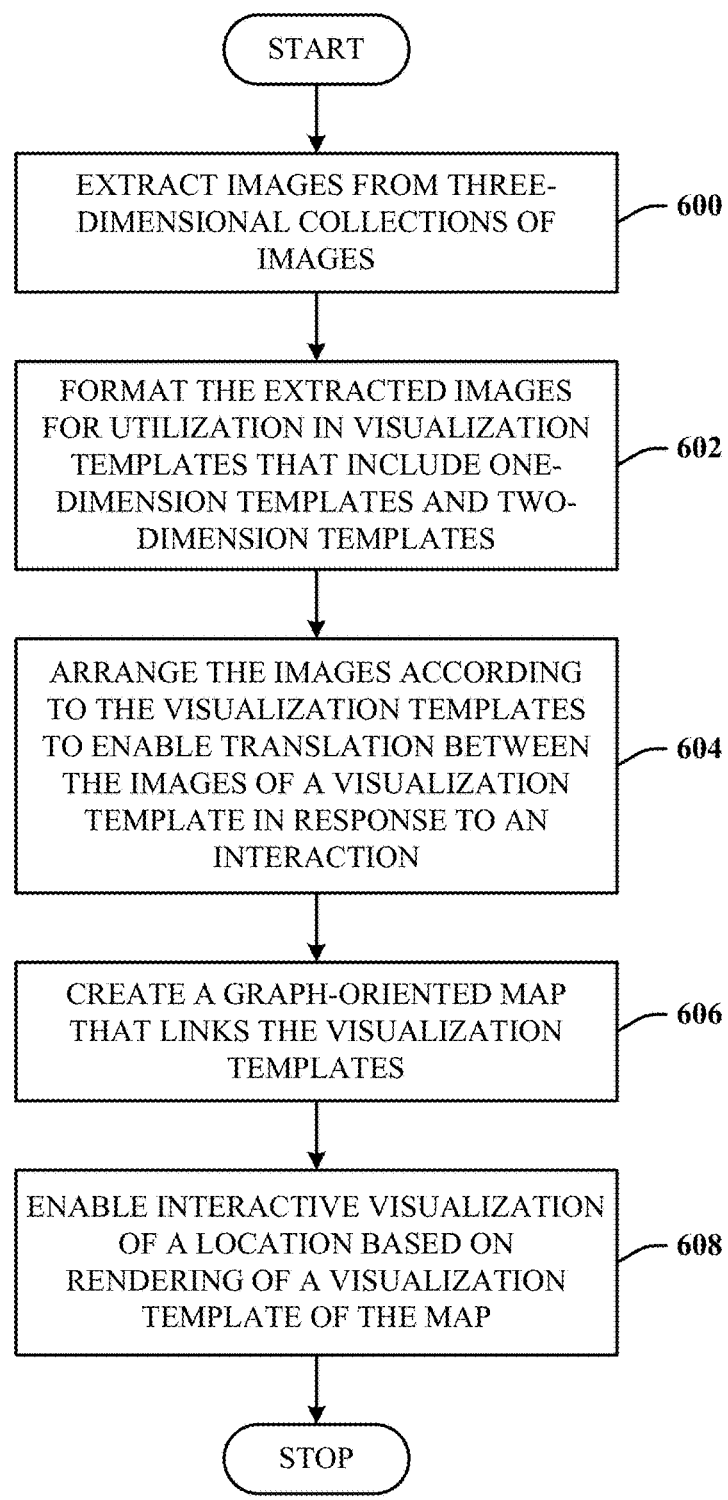
FIG. 6 illustrates an alternative method in accordance with the disclosed architecture.

FIG. 6 illustrates an alternative method in accordance with the disclosed architecture. The method can be embodied as a computer-readable storage medium comprising computer-executable instructions that when executed by a microprocessor, cause the microprocessor to perform the following acts. At 600, images are extracted from three-dimensional collections of images. At 602, the extracted images are formatted for utilization in visualization templates that include one-dimension templates and two-dimension templates. At 604, the images are arranged according to the visualization templates to enable translation between the images of a visualization template in response to an interaction. At 606, a graph-oriented map is created that links the visualization templates. At 608, interactive visualization of a location is enabled based on rendering of a visualization template of the map.

The method can further comprise enabling a street-level interactive map visualization of the location or an aerial-level interactive map visualization of the location. The method can further comprise identifying features of the location and selecting a visualization template based on the features. The features can comprise the type of location such as a neighborhood, street, building, landmark, etc.

The method can further comprise mapping a given template to an axis of a display, which provides an experience close to direct manipulation. The method can further comprise navigating between the linked templates (manifolds) in response to an interactive tapping, movement beyond a template edge, or movement orthogonal to the template.

As used in this application, the terms "component" and "system" are intended to refer to a computer-related entity, either hardware, a combination of software and tangible hardware, software, or software in execution. For example, a component can be, but is not limited to, tangible components such as a microprocessor, chip memory, mass storage devices (e.g., optical drives, solid state drives, and/or magnetic storage media drives), and computers, and software components such as a process running on a microprocessor, an object, an executable, a data structure (stored in a volatile or a non-volatile storage medium), a module, a thread of execution, and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
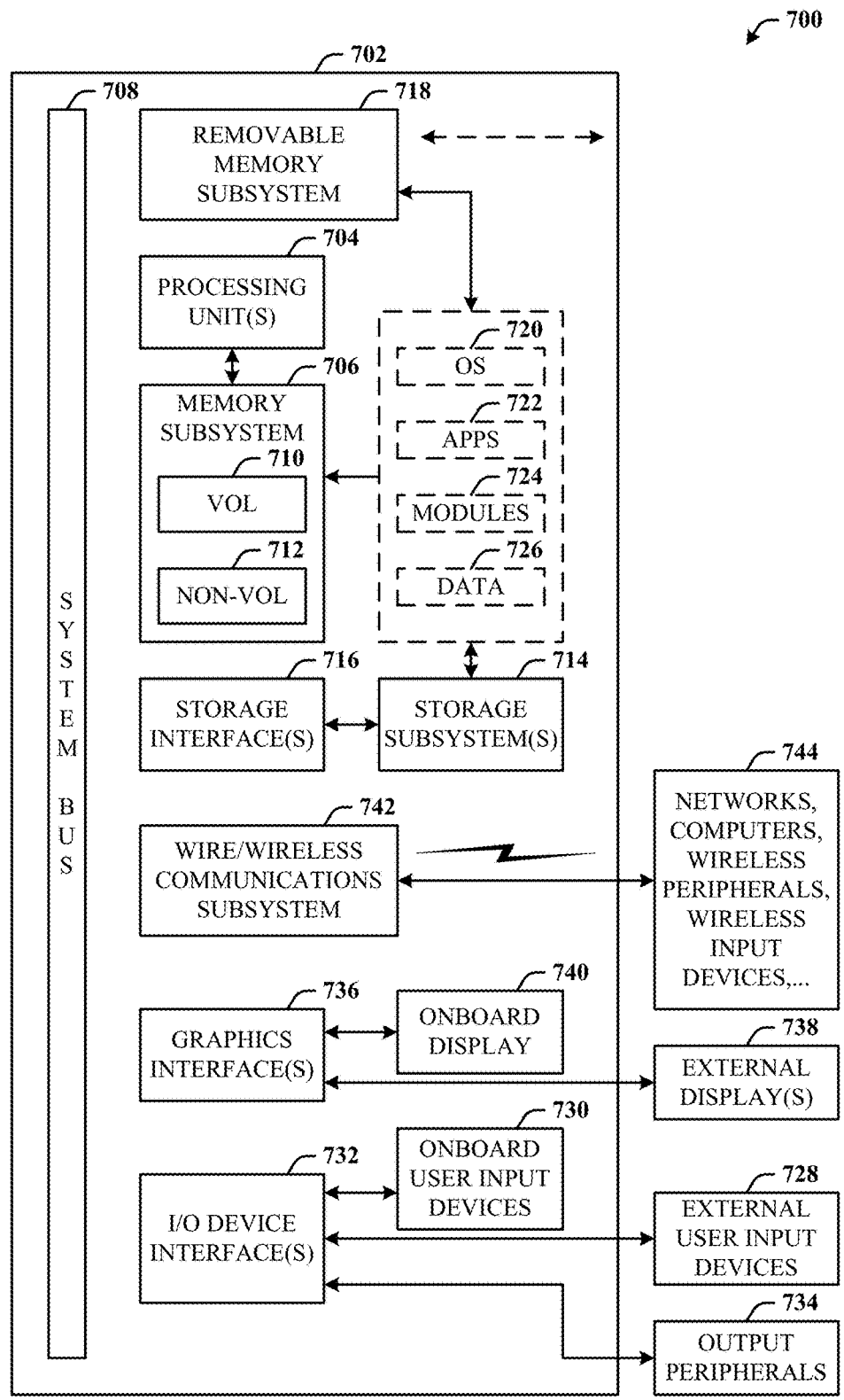
FIG. 7 illustrates a block diagram of a computing system that executes image extraction and image-based rendering for manifolds of terrestrial and aerial visualizations in accordance with the disclosed architecture.

Referring now to FIG. 7, there is illustrated a block diagram of a computing system 700 that executes image extraction and image-based rendering for manifolds of terrestrial and aerial visualizations in accordance with the disclosed architecture. However, it is appreciated that the some or all aspects of the disclosed methods and/or systems can be implemented as a system-on-a-chip, where analog, digital, mixed signals, and other functions are fabricated on a single chip substrate.

In order to provide additional context for various aspects thereof, FIG. 7 and the following description are intended to provide a brief, general description of the suitable computing system 700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 700 for implementing various aspects includes the computer 702 having microprocessing unit(s) 704 (also referred to as microprocessor(s) and processor(s)), a computer-readable storage medium such as a system memory 706 (computer readable storage medium/media also include magnetic disks, optical disks, solid state drives, external memory systems, and flash memory drives), and a system bus 708. The microprocessing unit(s) 704 can be any of various commercially available microprocessors such as single-processor, multi-processor, single-core units and multi-core units of processing and/or storage circuits. Moreover, those skilled in the art will appreciate that the novel system and methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 702 can be one of several computers employed in a datacenter and/or computing resources (hardware and/or software) in support of cloud computing services for portable and/or mobile computing systems such as wireless communications devices, cellular telephones, and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 706 can include computer-readable storage (physical storage) medium such as a volatile (VOL) memory 710 (e.g., random access memory (RAM)) and a non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the system memory 706 to the microprocessing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes machine readable storage subsystem(s) 714 and storage interface(s) 716 for interfacing the storage subsystem(s) 714 to the system bus 708 and other desired computer components and circuits. The storage subsystem(s) 714 (physical storage media) can include one or more of a hard disk drive (HDD), a magnetic floppy disk drive (FDD), solid state drive (SSD), flash drives, and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a machine readable and removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

The operating system 720, one or more application programs 722, other program modules 724, and/or program data 726 can include items and components of the system 100 of FIG. 1, items and components of the system 200 of FIG. 2, items and components of the system 300 of FIG. 3, items and components of the manifold 400 of FIG. 4, and the methods represented by the flowcharts of FIGS. 5 and 6, for example.

Generally, programs include routines, methods, data structures, other software components, etc., that perform particular tasks, functions, or implement particular abstract data types. All or portions of the operating system 720, applications 722, modules 724, and/or data 726 can also be cached in memory such as the volatile memory 710 and/or non-volatile memory, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so on. Such instructions, when executed by a computer or other machine, can cause the computer or other machine to perform one or more acts of a method. Computer-executable instructions comprise, for example, instructions and data which cause a general purpose computer, special purpose computer, or special purpose microprocessor device(s) to perform a certain function or group of functions. The computer executable instructions may be, for example, binaries, intermediate format instructions such as assembly language, or even source code. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) exclude (excludes) propagated signals per se, can be accessed by the computer 702, and include volatile and non-volatile internal and/or external media that is removable and/or non-removable. For the computer 702, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

A user can interact with the computer 702, programs, and data using external user input devices 728 such as a keyboard and a mouse, as well as by voice commands facilitated by speech recognition. Other external user input devices 728 can include a microphone, an IR (infrared) remote control, a joystick, a game pad, camera recognition systems, a stylus pen, touch screen, gesture systems (e.g., eye movement, body poses such as relate to hand(s), finger(s), arm(s), head, etc.), and the like. The user can interact with the computer 702, programs, and data using onboard user input devices 730 such a touchpad, microphone, keyboard, etc., where the computer 702 is a portable computer, for example.

These and other input devices are connected to the microprocessing unit(s) 704 through input/output (I/O) device interface(s) 732 via the system bus 708, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP-based) using logical connections via a wired/wireless communications subsystem 742 to one or more networks and/or other computers. The other computers can include workstations, servers, routers, personal computers, microprocessor-based entertainment appliances, peer devices or other common network nodes, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related technology and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing device, comprising:
one or more processors coupled to a computer-readable storage device, the computer-readable storage device having stored thereon a plurality of instructions causing the one or more processors to:
extract images related to a three-dimensional real world location, from image sources that include at least one of structured aerial-based image sources or structured ground-based image sources based on the location;
format the extracted images from the image sources into a suitable format for a two-dimensional visualization template; and
arrange the extracted images according to the two-dimensional visualization template, the two-dimensional visualization template comprising a local graph that specifies relationship information between the extracted images, wherein the two-dimensional visualization template is configured to enable translation between the extracted images via a viewer; and
create a graph-oriented map that enables linking and navigation between the two-dimensional visualization template and other visualization templates to provide, on a display associated with a computing device, an interactive multi-dimensional visualization for a continuously navigable experience of the real world location.

2. The computing device of claim 1, wherein the two-dimensional visualization template or at least one of the other visualization templates represents a street-level view of the location based on street-level shots extracted from the structured ground-based image sources.

3. The computing device of claim 1, wherein the two-dimensional visualization template or at least one of the other visualization templates represents an aerial view of the location based on aerial shots extracted from the structured aerial-based image sources.

4. The computing device of claim 1, wherein the plurality of instructions further cause the one or more processors to extract perspective images of forward shots and side shots from a panorama image.

5. The computing device of claim 1, wherein the two-dimensional visualization template or at least one of the other visualization templates enables the perception of image changes in time and space via the viewer.

6. The computing device of claim 1, wherein the two-dimensional visualization template or at least one of the other visualization templates enables the play of time information that corresponds to navigation through the images of the two-dimensional visualization template or the at least one of the other visualization templates.

7. The computing device of claim 1, wherein the plurality of instructions further cause the one or more processors to create a graph of spatially-related packets of templates obtained from a map and structured hierarchically for interactive transitions between the packets.

8. A method, comprising acts of:
selecting a two-dimensional visualization template by which to render a real world location for interactive navigation;
extracting images related to the real-world location from three-dimensional image collections for use with the two-dimensional visualization template, the two-dimensional visualization template comprising a local graph that specifies relationship information between the extracted images;
arranging the images according to the two-dimensional visualization template to enable translation between the images; and
creating a graph-oriented map that enables linking and navigation between the two-dimensional visualization template and other visualization templates to provide, on a display associated with a computing device, an interactive multi-dimensional visualization for a continuously navigable experience of the real world location via the images.

9. The method of claim 8, further comprising creating photorealistic transitions between multiple content types of the images according to the two-dimensional visualization template.

10. The method of claim 8, further comprising formatting image content to be compatible with the two-dimensional visualization template.

11. The method of claim 8, further comprising formatting image content from sources that comprise structured aerial images, structured ground-based images, and crowd-sourced images.

12. The method of claim 8, further comprising rendering the images of the two-dimensional visualization template in correspondence to time of day.

13. The method of claim 8, further comprising enabling rendering of the two-dimensional visualization template as one of a panorama, wall, walk, or a spin.

14. A computer-readable hardware storage device comprising computer-executable instructions that when executed by a microprocessor, cause the microprocessor to perform acts of:
extracting images from three-dimensional collections of images;
formatting the extracted images for utilization in a plurality of visualization templates that include one-dimensional templates and two-dimensional templates, wherein at least one of the two-dimensional templates comprises a local graph that specifies relationship information between the extracted images;
arranging the images according to the plurality of visualization templates to enable translation between the images of a visualization template in response to an interaction;
creating a graph-oriented map that enables linking and navigation between the plurality of visualization templates; and
enabling, on a display associated with a computing device, an interactive multi-dimensional visualization for a continuously navigable experience of a real world location based on rendering of a visualization template of the map.

15. The storage device of claim 14, further comprising enabling a street-level interactive map visualization of the location or an aerial-level interactive map visualization of the location.

16. The storage device of claim 14, further comprising identifying features of the location and selecting a visualization template of the plurality of visualization templates based on the features.

17. The storage device of claim 14, further comprising mapping a visualization template of the plurality of visualization templates to an axis of a display.

18. The storage device of claim 14, further comprising navigating between the plurality of visualization templates in response to an interactive tapping, movement beyond a template edge, or movement orthogonal to the template.

\* \* \* \* \*